United States Patent
Carbonell et al.

(10) Patent No.: US 6,736,996 B1
(45) Date of Patent: May 18, 2004

(54) COMPOSITIONS FOR PROTECTING CIVIL INFRASTRUCTURE

(75) Inventors: Ruben G. Carbonell, Raleigh, NC (US); Joseph M. DeSimone, Chapel Hill, NC (US); Florence E. Henon, Raleigh, NC (US)

(73) Assignees: North Carolina State University, Raleigh, NC (US); University of North Carolina at Chapel Hill, Chapel Hill, NC (US)

( * ) Notice: Subject to any disclaimer, the term of this patent is extended or adjusted under 35 U.S.C. 154(b) by 0 days.

(21) Appl. No.: 09/619,993

(22) Filed: Jul. 20, 2000

Related U.S. Application Data

(62) Division of application No. 08/948,733, filed on Oct. 10, 1997, now Pat. No. 6,127,000.

(51) Int. Cl.[7] .............................................. C09K 3/00
(52) U.S. Cl. ................................ 252/383; 252/380
(58) Field of Search ................................ 252/380, 383

(56) References Cited

U.S. PATENT DOCUMENTS

| | | | |
|---|---|---|---|
| 4,582,731 A | 4/1986 | Smith | 427/421 |
| 4,745,009 A | 5/1988 | Piacenti et al. | 427/393.5 |
| 4,746,550 A | 5/1988 | Strepparola et al. | 427/385.5 |
| 4,902,538 A | 2/1990 | Piacenti et al. | 427/393.6 |
| 4,923,720 A * | 5/1990 | Lee et al. | 427/422 |
| 5,009,367 A * | 4/1991 | Nielsen | 239/3 |
| 5,186,974 A * | 2/1993 | Gribbin et al. | 427/536 |
| 5,211,342 A | 5/1993 | Hoy et al. | 239/707 |
| 5,496,901 A * | 3/1996 | DeSimone | 526/89 |
| 5,679,737 A * | 10/1997 | DeSimone et al. | 524/529 |
| 5,863,612 A | 1/1999 | DeSimone | 427/422 |
| 6,030,663 A | 2/2000 | McClain et al. | 427/389.9 |
| 6,051,682 A * | 4/2000 | Debrabander et al. | 528/501 |
| 6,165,559 A * | 12/2000 | McClain et al. | 427/388.1 |

FOREIGN PATENT DOCUMENTS

WO    WO 97/28205    8/1997

OTHER PUBLICATIONS

Supplementary European Search Report for EP 98 95 3303 dated Jun. 2, 2003.

* cited by examiner

*Primary Examiner*—Cephia D. Toomer
(74) *Attorney, Agent, or Firm*—Myers Bigel Sibley & Sajovec

(57) ABSTRACT

A method of protecting a civil infrastructure substrate from the damaging effects of pollution, noxious fumes, weather, and the like. The method comprises (a) providing a composition comprising carbon dioxide and a fluorocarbon such as a fluoropolyether (preferably a perfluoropolyether) or a fluorocarbon elastomer, optionally having at least one anchoring group such as an amide covalently joined thereto, and then (b) applying that composition to the civil infrastructure substrate to form a protective coating thereon. The applying step is preferably carried out by spraying. Compositions useful for carrying out the process of the invention are also disclosed.

21 Claims, 3 Drawing Sheets

US 6,736,996 B1

COMPOSITIONS FOR PROTECTING CIVIL INFRASTRUCTURE

This application is a division of application Ser. No. 08/948,733, filed Oct. 10, 1997, now U.S. Pat. No. 6,127,000.

FIELD OF THE INVENTION

This invention relates to methods and materials that are useful for protecting civil infrastructure, including monumental works of art, from the degrading effects of atmospheric pollutants.

BACKGROUND OF THE INVENTION

The protection of stone in historic buildings with fluoropolyethers is known. The use of neutral fluoropolyethers for such protection is described in U.S. Pat. No. 4,499,146 to Piacenti et al.; the use of fluoropolyethers that have at least on anchoring group bound thereto is described in U.S. Pat. No. 4,745,009 to Piacenti et al., U.S. Pat. No. 4,746,550 to Strepparola et al., and U.S. Pat. No. 4,902,538 to Piacenti et al. Unfortunately, such techniques rely on environmentally deleterious solvents such as chlorofluorocarbons. Because of the extremely large volumes of compositions required to protect such civil infrastructure, the use of compositions that contain environmentally undesireable solvents is a severe problem.

Carbon dioxide has been used as a solvent for some fluoropolymers (see, e.g., U.S. Pat. No. 5,496,901 to DeSimone). V. Krukonis and M. McHugh, *Supercritical Fluid Extraction*, 156–158, describe the fractionation of a perfluoroalkylpolyether oil and a chlorotrifluoroethylene oligomer in supercritical carbon dioxide. None of this literature suggests methods of protecting civil infrastructure with such materials.

U.S. Pat. No. 5,211,342 to Hoy et al. describes electrostatic liquid coating application processes in which supercritical fluids such as carbon dioxide are used to coat substrates with various polymers. Civil infrastructure substrates are neither suggested nor disclosed, and fluoropolyether polymers are neither suggested nor disclosed. In addition, while electrostatic spraying techniques are useful for circuit boards and other small substrates, they are less desireable for the treatment of civil infrastructure substrates.

U.S. Pat. No. 4,923,720 to Lee et al. describes supercritical fluids such as carbon dioxide as diluents for the application of viscous coatings, but does not suggest such coatings for civil infrastructure.

In view of the foregoing, there is a continued need for new techniques for treating civil infrastructure substrates to protect them from the damaging effects of pollution, weather, noxious fumes and the like.

SUMMARY OF THE INVENTION

A first aspect of the present invention is a method of protecting a civil infrastructure substrate from the damaging effects of pollution, noxious fumes, weather, and the like. The method comprises (a) providing a composition comprising carbon dioxide and a fluoropolyether, and then (b) applying that composition to the civil infrastructure substrate in an amount sufficient to form a protective coating thereon.

A second aspect of the present invention is a composition useful for protecting civil infrastructure. The composition comprises a mixture of carbon dioxide and a fluoropolyether, the fluoropolyether having at least one anchoring group covalently joined thereto.

A third aspect of the present invention is a method of protecting a civil infrastructure substrate from the damaging effects of pollution, noxious fumes, weather, and the like. The method comprises (a) providing a composition comprising carbon dioxide and a fluorocarbon elastomer, and then (b) applying that composition to the civil infrastructure substrate in an amount sufficient to form a protective coating thereon.

Advantageously, the compositions of the present invention do not form a a surface coating or film on the surface of a civil infrastructure when they are applied thereto. Instead, they penetrate into the pores of the material, so that the coating is incorporated into the material and the material retains a more natural appearance.

The foregoing and other objects and aspects of the present invention are explained in detail in the specification set forth below.

DETAILED DESCRIPTION OF THE INVENTION

Figure 1:
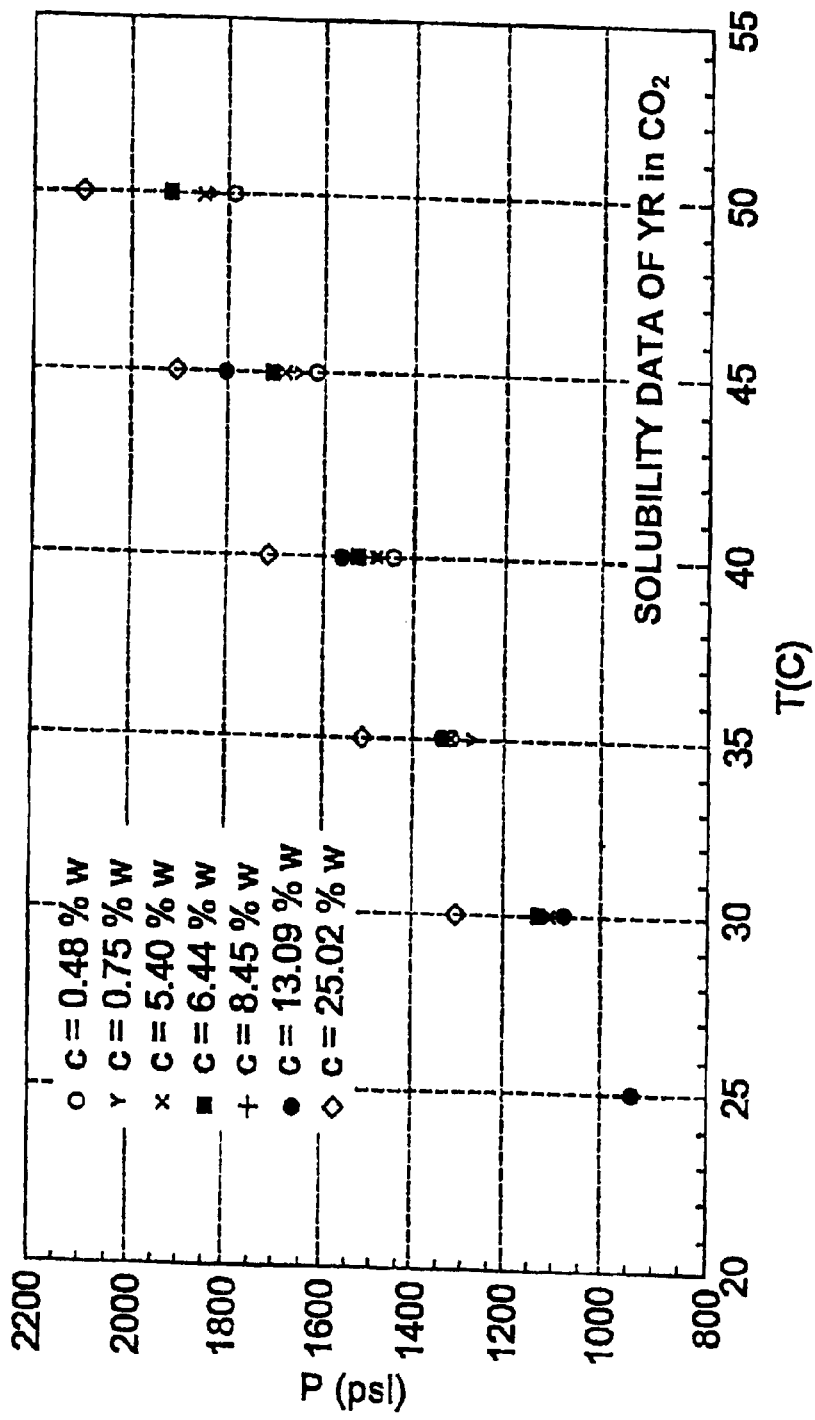
FIG. 1 shows the cloud points for the fluoropolyether YR at different pressures, temperatures, and concentrations.

The present invention is useful for protecting any civil infrastructure substrate. Civil infrastructure substrates are, in general, porous substrates, such as stone (e.g., marble, granite, sandstone, limestone), ceramic, cement, brick, and combinations or agglomerations thereof such as concrete. Wood, including both hardwoods (that is, wood from broadleaf species) such as oak and softwoods (that is, wood from conifer species) such as pine, is also considered a civil infrastructure substrate herein. The substrate may be in any form, such as a statue or other monument or work of art, a building, or a building material (i.e., wood, stone, or a prefrabricated material prior to structural assembly)

Fluoropolyethers are polymeric compounds composed of multiple, sequentially linked, fluorinated aliphatic ether units (e.g., polymers of the formula $(RO)_n$—R wherein the R groups are the same or different and are linear or branched, saturated or unsaturated C1–C4 alkyl, typically linear or branched saturated C1–C4 alkyl, with the number of repeats "n" giving the desired molecular weight): perfluoropolyethers refer to such polymers in which essentially all of the hydrogens have been substituted with fluorine. Perfluoropolyethers are preferred. In general, the fluoropolyethers used to carry out the present invention have an average molecular weight of from about 500 or 3,000 grams per mole up to about 10,000 or 20,000 grams per mole.

Neutral fluoropolyethers (that is, fluoropolyethers that do not carry anchoring groups) as described in U.S. Pat. No. 4,499,146 may be used to carry out the present invention. Preferably, the fluoropolyethers have at least one anchoring group covalently joined thereto, typically at either, or both, of the chain ends thereof. Any suitable anchoring group may be used which enhances the adsorption of the fluoropolymer to the substrate. Suitable anchoring groups include, but are not limited to, polar (including dipolar and quadrupolar) groups, groups that have an acid-base interaction with the substrate, groups that hydrogen bond to the substrate, groups that bond ionically or covalently to the substrate, etc. Examples of structures that serve as such groups include, but are not limited to, amides, esters, carboxylic acids, urethanes, ureas, mercaptans, etc. Nitrogen-containing groups are preferred. Numerous fluoropolyethers, particularly perfluoropolyethers, that possess such functional groups are known, such as those described in U.S. Pat. No. 4,745,009 to Piacenti et al., U.S. Pat. No. 4,746,550 to Strepparola et al., and U.S. Pat. No. 4,902,538 to Piacenti et al. (the disclosures of all U.S. Patent References cited herein are incorporated herein by reference).

Fluorocarbon elastomers (see, e.g., 7 Encyclopedia of Polymer Science & Engineering 257) are a group of amorphous fluoroolefin polymers that include, but are not limited to, poly(vinylidene fluoride-co-hexafluoropropylene); poly(vinylidene fluoride-co-hexafluoropropylene-co-tetrafluoroethylene); poly[vinylidene fluoride-co-tetrafluoroethylene-co-perfluoro(methyl vinyl ether)]; poly[tetrafluoroethylene-co-perfluoro(methyl vinyl ether)]; poly(tetrafluoroethylene-co-propylene; and poly(vinylidene fluoride-co-chlorotrifluoroethylene). Such fluorocarbon elastomers may, if desired, have at least one anchoring group as described above covalently joined thereto in accordance with techniques known or apparent to those skilled in the art, with the anchoring group typically at either, or both, of the chain ends thereof.

The term "fluorocarbon" as used herein is intended to encompass both fluoropolyethers and fluorocarbon elastomers.

Carbon dioxide as a carrier or solvent is combined with the fluorocarbon to provide a mixture which is then applied to the substrate. The mixture may be in any form, but is preferably a single-phase mixture, or solution, and is preferably provided as a liquid or supercritical fluid (the term "supercritical solution" also being used herein to refer to supercritical fluid). In general, from about 0.1 or 1 to 20, 40 or 80 percent (by weight) of the mixture is comprised of the fluorocarbon. The fluorocarbon may be essentially all of one type as described above, or may be a mixture of fluorocarbons as described above (e.g., a mixture of neutural fluoropolyethers and fluoropolyethers that carry an anchoring group).

Compositions used to carry out the present invention may consist essentially of the fluorocarbon and the carbon dioxide, with only minor amounts of cosolvents, surfactants or the like included therein, or may include additional ingredients. For example, the composition may contain a fine powder or particles formed from a polymer such as polytetrafluoroethylene (including copolymers thereof), as described in U.S. Pat. No. 4,902,538 to Piacenti et al. Such particles are included in the mixture in an amount of from about 2 or 10 to 20 or 30 percent by weight.

The applying step may be carried out by any suitable means, such as spraying or submerging or dipping the substrate in a vat or bath of the mixture. Spraying is particularly preferred. In general, spraying is carried out by passing the composition under pressure through an orifice into the environment of, and directed at, the substrate to which the composition is to be applied. Spraying may be carried out by any suitable means, including atomizing (or nebulizing) the mixture, or, where the mixture is a supercritical solution, by the rapid expansion of [that] supercritical solution (a process known as "RESS"). The amount of fluoropolyether deposited on the substrate will depend on factors such as the particular substrate, its condition, and the environment in which it is used, but will typically be from about 5 or 10 to 300 or 500 grams per square meter.

The present invention is explained in greater detail in the following non-limiting examples, in which "ml" means milliliters, "psi" means pounds per square inch, "sec" means seconds, "$\mu$m" means micrometers, "cSt" means centistokes, and temperatures are given in degrees centigrade.

EXAMPLE 1

Solubility Studies

The purpose of this Example was to obtain information on the solubility of perfluoropolyethers in $CO_2$ to develop procedures for applying such compositions.

The static phase equilibria measurements were performed using a stainless steel variable volume cell. The cell, of 30 ml total capacity, can be operated at pressures up to 10,000 psi. It is fitted on one side with a sapphire window, 1 inch in diameter and ⅜ inch thick (see Meilchen et al., *Macromolecules* 24, 4874 (1991)), and on the other side with a manually movable piston. Two holes located on the side of the device allow for the reading of the temperature through a thermocouple (Pt/PrRh) thermocouple) and the reading of the pressure through a transducer (Sensotec transducer, model TJE/743-11). The solvent is compressed with an ISCO syringe pump (model 260D) through a valve connected to the pressure transducer. This transducer is itself connected to a Sensotec digital monitor which allows the reading of the cell pressure within about +/−1 psi. The cell is surrounded by heating tape, and the pressure in the cell is imposed by manually moving the inside piston. The density of the mixture at a given pressure and temperature is given by an ISCO computer program.

At constant temperature the pressure is slowly reduced (~5 psi/sec) until separation occurs (fluid→liquid+liquid phase separation). The cloud point is then recorded. The cloud point, defined as the point where the phase separation begins, is to observed directly through the sapphire window or followed visually on a monitor connected to optical fibers to light the inside of the cell. It has been noticed that when the pressure is reduced by only 2 psi/sec the cloud points obtained are about 60 psi lower. This behavior may be explained by admitting that at low pressure reduction rates, the polymer precipitation is not accompanied by changes in the optical characteristics of the mixture for accuracy, each cloud point condition was repeated several times (4 or 5) and the reproducibility obtained was within +/−22 psi.

Six fluorinated polymers and one elastomer were studied. These polymers are denoted YR, IBAo (IBAG2200), IBA1, DC2Ao (DC2G2200), DC6A0 (DC6G2200) and PAS and the elastomer is abbreviated NH. While the IBA1 was kindly provided by Ausimont S.p.A, and used as such, the other polymers were synthesized and characterized in accordance with known techniques. See F. Piacenti and M. Camaiti, *J. Fluorine Chemistry* 68, 227 (1994). The physical properties and chemical formulas of these polymers are given in Table 1 and Table 2 below.

TABLE 1

Chemical formula and abbreviation of polymers.

| Abbreviation | Formula | State |
|---|---|---|
| YR | $CF_3$—O—Rf—$CF_3$ | oil |
| IBAG2200 | $CF_3$—O—Rf—$CF_2$—CO—NH—$CH_2$—CH—$(CH_3)_2$ | oil |
| IBA1 | 40% IGAG2200/60% YR | oil |
| DC2G2200 | $CF_3$—O—Rf—$CF_2$—CO—NH—$(CH_2)_2$—NH—CO—$CF_2$—Rf—$CF_3$ | oil |
| DC6G2200 | $CF_3$—O—Rf—$CF_2$—CO—NH—$(CH_2)_6$—NH—CO—$CF_2$—Rf—$CF_3$ | oil |
| PAS | —CO—NH—$(CH_2)_6$—NH—CO—$CF_2$—O—Rf—$CF_2$—CO—NH— | viscous oil |
| NH | —[$CH_2$—$CF_2$]$_m$—($CF_2$—CF($CF_3$)—$CH_2$—$CF_2$]$_n$— | rubber |
| —Rf— | —[$Cf_2$—CF($CF_3$)—O]$_m$—($CF_2$—O]$_n$— | |

TABLE 2

Physical properties of the material used.

| Abbreviation | $d^4 25°$ C. | Viscosity at 20° C.[a] | Avg. m.w. found |
|---|---|---|---|
| YR | 1.894 | 1597 | 6500[b] |
| IBAG2200 | 1.822 | 1008 | 2280[c] |
| IBA1 | 1.839 | 330 | n.a |
| DC2G2200 | 1.880 | 43362 | 4485[c] |
| DC6G2200 | 1.830 | 29997 | 4560[c] |
| PAS | n.a. | n.a. | n.a. |
| NH | n.a. | n.a. | 360000[d] |

[a]The viscosity values were obtained with a Cannon Fenske capillary viscometer.
[b]Average m.w. measured by $^{19}$FNMR
[c]Average m.w. measured by vapor pressure osmometry
[d]Average m.w. measured by membrane osmometry in methyl ethyl ketone as solvent.

The solubility measurements of these polymers were performed at different concentrations, temperatures and pressures. The results obtained (FIGS. 1, 2A, and 2b) indicate that these fluorinated polymers are soluble at up to a 25% weight concentration, and at fairly low temperature and pressure, 60° C. and 3000 psi respectively.

The solubility data of the YR polymer at different concentrations are reported in FIG. 1. As a general trend, the higher the temperature of the fluid mixture, the higher the solubility pressure. But for a given temperature, the pressure required to dissolve the polymer increases with the weight concentration of that polymer in the solvent. It is to be noted however, that a 50% increase in the concentration results in only a 15% increase in pressure, when the temperature is kept constant.

Figure 2A:
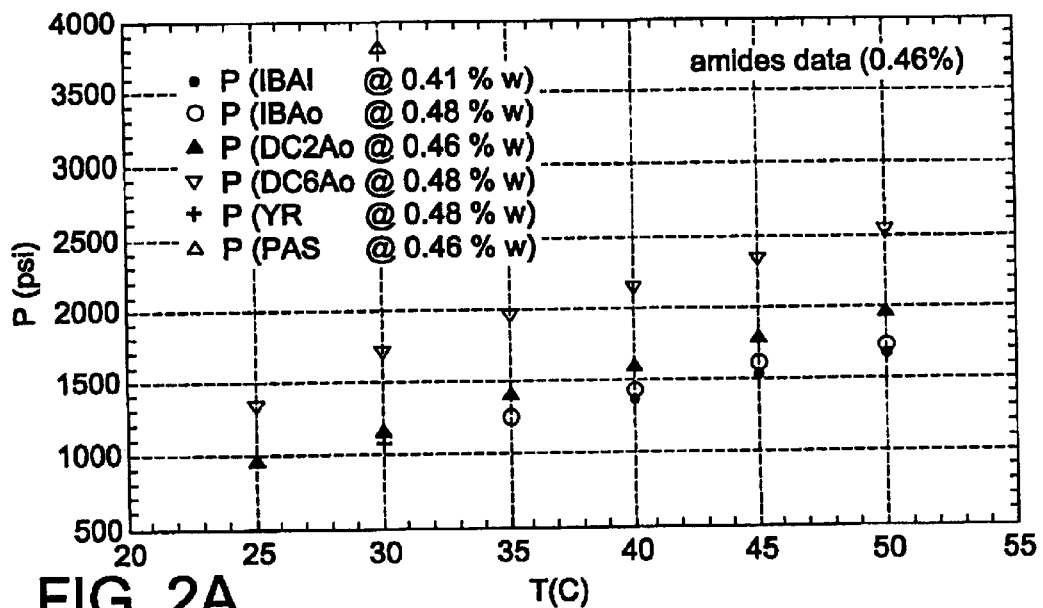
FIG. 2A shows the cloud points of various polymers at different pressures and temperatures for a concentration of 0.45% by weight.
Figure 2B:
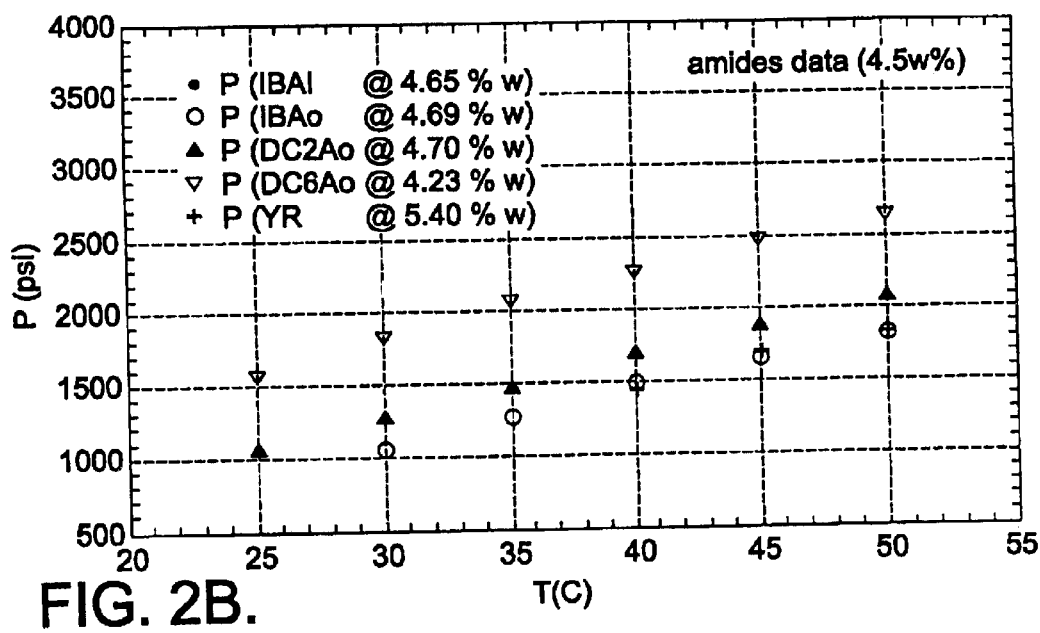
FIG. 2B shows the cloud points of various polymers at different pressures and temperatures for a concentration of 4.5% by weight.

FIGS. 2a and 2b give the cloud point measurements for the six polymers studied at concentrations of 0.45 and 4.5% by weight respectively. The difference in the solubility of these polymers is explained by the difference in molecular weight, number of polar groups and viscosity.

YR, IBAo and IBA1 are three polymers with approximately the same viscosity, and from the graphs, approximately the same solubility in supercritical $CO_2$. The slightly lower solubility of YR is probably due to its higher molecular weight. The diamides have a molecular weight which is twice that of IBAo (4800 g/mol vs. 2400 g/mol), and it is normal that their solubility be lower. From a viscosity point of view, it would have been expected that DC2A0, with a viscosity of 43000 cSt, be less soluble than the DC6Ao, of viscosity 30000 cSt. However, the longer $CH_2$ chains found in the DC6Ao polymer might also explain the lower solubility of the hexamethylene diamide versus the ethylene diamide, as these $CH_2$ groups are not soluble in $CO_2$ (data not shown).

Solubility measurements for the PAS product were performed at different temperatures and concentrations, but the polymer appeared to be soluble only at very low concentration and at relatively high pressures. The only cloud point obtained for this polymer was at 30° C. for a concentration of 0.46% by weight; the pressure required for solubilization was 3800 psi.

Experimental solubility of the elastomer in supercritical carbon dioxide, confirmed that the percentage of hydrogen content increased the cloud point pressure. With a molecular weight of 360,000 and a 1.94% of hydrogen content the NH elastomer is not completely soluble, even at temperature of 70° C. and pressure of 5075 psi.

EXAMPLE 2

Spraying by Rapid Expansion of Supercritical Solution

Figure 3:
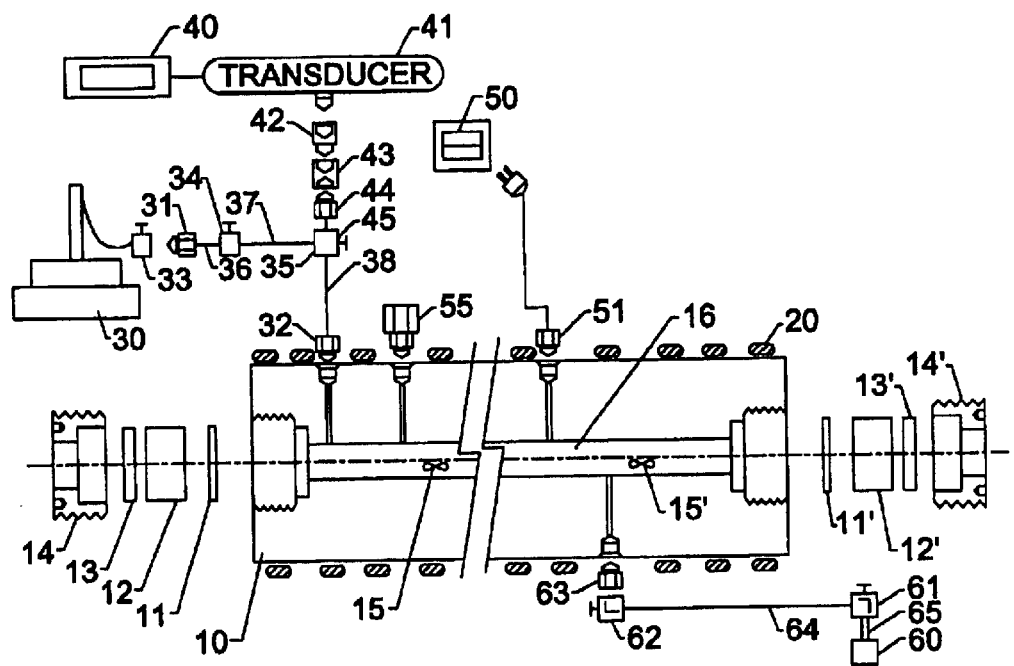
FIG. 3 illustrates a spraying apparatus useful for carrying out the present invention.
Figure 4:
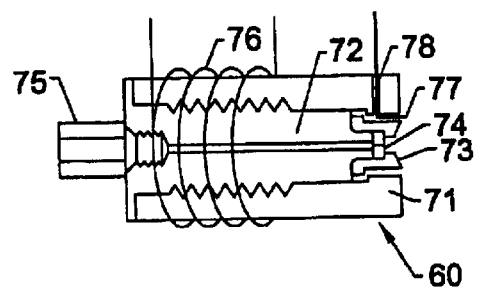
FIG. 4 illustrates the nozzle portion of a spraying apparatus for carrying out the present invention.

An apparatus that can be used to carry out the present invention is schematically illustrated in FIGS. 3 and 4. The apparatus comprises a 40 centimeter cylinder 10 that is sealed at each end with a teflong ring 11, 11', a sapphire window 12, 12', a brass ring 13, 13'and a screw cap 14, 14'. The apparatus contains stir bars 15, 15', within an internal chamber 16, and can be positioned over a pair of stiring plates (not shown). Heating tape 20 surrounds the cylinder.

External to the cylinder, a syringe pump 30 is connected to the internal chamber 16 by a appropriate fittings 31, 32, valves 33, 34, 35, and tubing 36, 37, 38. A pressure monitor 40 is connected via a transducer 41 to the syringe pump valve 35, again by appropriate adapters 42, 43, 44 and tubing 45. A temperature controller 50 is connected to a thermocouple 51 to control the heating tape. A pressure relief valve 55 is also included. A nozzle 60 is connected to the internal chamber 16 by means of valves 61, 62, fitting 63 and tubing 64, 65.

The nozzle 60 is shown in greater detail in FIG. 4. The nozzle comprises a housing 71 into which is threadably inserted a body member 72. A retainer member 73 is used to secure a pin hole member 74. The entire nozzle assembly is constructed so that the pin hole member 74 may be replaced with different pin hole members that have different diameter orifices formed therethrough (e.g., 30 μm, 50 μm, 70 μm, 100 μm, 200 μm). A fitting 75 secures the nozzle 60 to tubing 65, and a coil heater 76 associated with a temperature controller (not shown) is provided around the housing. A thermocouple, also associated with the temperature controller (not shown) is positioned in the area of the spray through a side port opening 78.

In a preferred embodiment of the foregoing, a metering valve and an additional pressure transducer are incorporated into tubing 64 to provide a better reproducibility of the flow.

It will be appreciated that the foregoing apparatus is adapted to optimizing the process of the present invention, but that the apparatus can be modified, expanded, to and/or simplified to adapt it to commercial use in a routine manner.

The RESS (rapid expansion of a supercritical solution, or expansion through an orifice of a solution at high pressure). In the RESS process, a dilute solution of a solute in a supercritical fluid is expanded through an orifice, from a high pressure to a low downstream pressure, causing the solute to be rejected from the solution due to the low solubility of the material at the gas-like solvent density. The process produces a thin film, droplets, powders or fibers of the polymer being sprayed. In general, RESS makes possible (if desired) the production of narrow and controllable particle size distributions and a highly uniform deposition of the coating on the substrates.

In an apparatus as described above, with a constant pressure in the cell Pc=4,000 psi, an initial temperature in the cell Tc=40° C., an initial temperature of the nozzle Tn=50° C., an initial concentration of polymer YR in the carbon dioxide of about 1% by weight, with an orifice diameter of 200 $\mu$m, with the spray directed onto a 5 cm×5 cm glass slide substrate, and with an initial volumetric flow rate of 60 ml/min and a smallest droplet size <0.04 cm, the results seen in Table 3 below were observed.

TABLE 3

RESS data.

| wt. % | Mass flow rate (g/min) | Volume flow rate (ml/min) |
| --- | --- | --- |
| 1.0981 | 0.1164 | 62.76 |
| 1.0875 | 0.0540 | 60.36 |
| 1.9711 | 0.0840 | 68.46 |
| 1.0513 | 0.1014 | 62.22 |
| 1.0376 | 0.0702 | 73.08 |
| 1.0058 | 0.1626 | 79.68 |
| 0.9827 | 0.1182 | 85.38 |
| 0.9621 | 0.1098 | 88.92 |
| 0.9485 | 0.0648 | 80.40 |
| 0.9367 | 0.0606 | 90.48 |
| 0.9293 | 0.0378 | 92.76 |
| 0.9259 | 0.0174 | 83.46 |
| 0.9189 | 0.0354 | 92.04 |
| 0.9158 | 0.0162 | 90.66 |
| 0.9138 | 0.0102 | 82.44 |
| 0.9099 | 0.0198 | 84.60 |
| 0.9045 | 0.0276 | 96.72 |
| 0.9000 | 0.0228 | 100.32 |
| 0.8977 | 0.0120 | 96.00 |
| 0.8934 | 0.0216 | 90.54 |

The volumetric flow rate tends to increase with a decrease in the polymer weight percent concentration. The mass flow rate also tends to decrease with a decrease in the polymer weight percent concentration. These data show that fluoropolyethers are soluble in $CO_2$, and they can be sprayed directly from the supercritical state using the RESS process. It was also observed that the sprayed polymers can form both droplets and a continuous film.

Wood (including both hardwoods such as oak and softwoods such as pine), ceramic tile, marble, sandstone, and limestone sample substrates are sprayed in the same manner as described above to form a protective fluoropolyether coating thereon.

Wood (including both hardwoods such as oak and softwoods such as pine), ceramic tile, marble, sandstone, and limestone sample substrates are sprayed with a fluorocarbon elastomer in essentially the same manner as described above to form a protective fluorocarbon elastomer coating thereon.

The foregoing is illustrative of the present invention, and is not to be construed as limiting thereof. The invention is defined by the following claims, with equivalents of the claims to be included therein.

What is claimed is:

1. A civil infrastructure protectant composition, said composition comprising;

a solvent consisting essentially of carbon dioxide and between about 0.1 and 20 percent of a fluoropolyether, said fluoropolyether having at least one anchoring group covalently joined thereto;

wherein said carbon dioxide is a liquid or supercritical fluid.

2. The composition according to claim 1, wherein said fluoropolyether is a perfluoropolyether.

3. The composition according to claim 1, wherein said anchoring group is selected from the group consisting of amides, esters, carboxylic acids, urethanes, ureas, and mercaptans.

4. The composition according to claim 1, wherein said anchoring group is an amide, ester, or carboxylic acid.

5. The composition according to claim 1, wherein said anchoring group is an amide.

6. The composition according to claim 1, wherein said composition is a single phase mixture.

7. The composition according to claim 1, wherein said composition consists essentially of carbon dioxide and between about 1 and 20 percent of said fluoropolyether.

8. A civil infrastructure protectant composition, comprising:

a solvent consisting essentially of carbon dioxide; and between about 0.1 and 40 percent of a fluoropolyether, said fluoropolyether having at least one anchoring group covalently joined thereto;

wherein said carbon dioxide is a liquid or supercritical fluid.

9. The composition according to claim 8, wherein said fluoropolyether is a perfluoropolyether.

10. The composition according to claim 8, wherein said anchoring group is selected from the group consisting of amides, esters, carboxylic acids, urethanes, ureas, and mercaptans.

11. The composition according to claim 8, wherein said anchoring group is an amide, ester, or carboxylic acid.

12. The composition according to claim 8, wherein said anchoring group is an amide.

13. The composition according to claim 8, wherein said composition is a single phase mixture.

14. The composition according to claim 8, wherein said composition consists essentially of carbon dioxide and between about 1 and 40 percent of said fluoropolyether.

15. A civil infrastructure protectant composition, said composition comprising:

a solvent consisting essentially of carbon dioxide; and between about 0.1 and 80 percent of a fluoropolyether, said fluoropolyether having at least one anchoring group covalently joined thereto wherein said carbon dioxide is a liquid or supercritical fluid.

16. The composition according to claim 15, wherein said fluoropolyether is a perfluoropolyether.

17. The composition according to claim 15, wherein said anchoring group is selected from the group consisting of amides, esters, carboxylic acids, urethanes, ureas, and mercaptans.

18. The composition according to claim 15, wherein said anchoring group is an amide, ester, or carboxylic acid.

19. The composition according to claim 15, wherein said anchoring group is an amide.

20. The composition according to claim 15, wherein said composition is a single phase mixture.

21. The composition according to claim 15, wherein said composition consists essentially of carbon dioxide and between about 1 and 80 percent of said fluoropolyether.

* * * * *